(12) United States Patent
Williamson et al.

(10) Patent No.: US 7,706,507 B2
(45) Date of Patent: Apr. 27, 2010

(54) RADIATION ATTENUATION FOR A SCANNING DEVICE

(75) Inventors: Adam Williamson, Sevierville, TN (US); Steven Dowd, Knoxville, TN (US)

(73) Assignee: Smiths Detection Inc., Alcoa, TN (US)

( * ) Notice: Subject to any disclaimer, the term of this patent is extended or adjusted under 35 U.S.C. 154(b) by 158 days.

(21) Appl. No.: 12/149,926

(22) Filed: May 9, 2008

(65) Prior Publication Data

US 2008/0310597 A1 Dec. 18, 2008

Related U.S. Application Data

(60) Provisional application No. 60/924,367, filed on May 10, 2007.

(51) Int. Cl.
*G21K 1/02* (2006.01)
(52) U.S. Cl. ........................ 378/147; 378/148
(58) Field of Classification Search .................... 378/57, 378/65, 62, 147–160
See application file for complete search history.

(56) References Cited

U.S. PATENT DOCUMENTS

| 3,324,294 | A | * | 6/1967 | McGrath, Jr. ............ 250/505.1 |
| 7,050,536 | B1 | | 5/2006 | Fenkart et al. |
| 7,164,749 | B2 | | 1/2007 | Schrock et al. |
| 2004/0076544 | A1 | | 4/2004 | Dao |

FOREIGN PATENT DOCUMENTS

| JP | 2004-132747 | 4/2004 |
| WO | WO 2006/079472 A1 | 8/2006 |

* cited by examiner

*Primary Examiner*—Irakli Kiknadze
(74) *Attorney, Agent, or Firm*—Foley & Lardner LLP

(57) ABSTRACT

A scanning device for providing a radiation scan to an article is disclosed. The scanning device includes a housing, a transport system and a radiation attenuation system. The housing has a entrance port and an exit port and encloses a radiation analysis unit. The transport system is configured to move the article from the entrance port, through the housing and to the exit port. The radiation attenuation system is supported at one of the entrance port and the exit port. The radiation attenuation system includes at least one substantially rigid panel rotatable relative to the housing and a counter balance coupled to the panel to at least partially offset the weight of the panel.

20 Claims, 4 Drawing Sheets

RADIATION ATTENUATION FOR A SCANNING DEVICE

BACKGROUND

The present disclosure relates generally to systems for shielding and/or attenuating radiation generated by a scanning device (e.g., an x-ray scanning device, etc.). More particularly, the present disclosure relates to systems for shielding and/or attenuating radiation generated by a scanning device used to monitor, inspect and/or treat food products, such as meat.

Analysis of objects using radiation scanning devices has become increasingly important in recent years. For example, scanning devices are used in airports, schools, government buildings and the like to detect potentially dangerous devices and/or contraband contained within packages, baggage, briefcases, purses, etc. Such scanning devices are capable of detecting the presence of explosives or other prohibited items. Scanning devices are also used in industry to monitor, inspect and/or treat various production products. One category of production products for which inspection is especially important is food products.

It may be desirable to monitor and/or control various food properties including, but not limited to, weight, temperature, amount of contaminants, nutrient levels, fat levels, and/or carbohydrate levels. This is especially true with respect to meat products or foods which contain animal-originating meat components. Meat products must be carefully inspected to ensure that the meat has the desired properties. Such properties include but are not limited to weight of the meat, meat yield (i.e., percentage of fat verses percentage of lean), meat tenderness, the effective atomic number of the meat, and the amount of contamination.

Scanning devices are based on the principle that a primary radiation beam is affected by the various components of the objects being scanned in distinct, measurable ways. In general, a primary radiation beam is directed at the object being scanned. The primary radiation beam passes through the object to ultimately impinge upon one or more sensors. A certain percentage of the radiation energy is absorbed by the object. The amount of energy absorbed depends on the density and atomic number of the object. As a result, the detected radiation attenuation provides an indication of the absorbed energy on the irradiated objects. Due to the absorbed energy being relative to the atomic number, it can be used in the object discrimination process.

While radiation is a valuable tool for applications wherein objects are being monitored, inspected and/or treated, the use of radiation may require certain safeguards due to the hazards associated therewith. Scanning devices not only expose an object to radiation, but often expose people near the scanning device (e.g., operators, technicians, baggage handlers, security personnel, etc.) to radiation (e.g., primary beam, secondary or scatter radiation, etc.). Although the amount of radiation exposure that people near the scanning device receive during a single scan may not be harmful, people near the scanning device for a number of such scans may suffer damage due to the cumulative effect of radiation. Accordingly there continues to be a need to provide improved radiation attenuation for scanning devices.

SUMMARY

One exemplary embodiment relates to a scanning device for providing a radiation scan to an article. The scanning device includes a housing, a transport system and a radiation attenuation system. The housing has a entrance port and an exit port and encloses a radiation analysis unit. The transport system is configured to move the article from the entrance port, through the housing and to the exit port. The radiation attenuation system is supported at one of the entrance port and the exit port. The radiation attenuation system includes at least one substantially rigid panel rotatable relative to the housing and a counter balance coupled to the panel to at least partially offset the weight of the panel.

Another exemplary embodiment relates to a radiation attenuation system for use with a scanning device. The radiation attenuation system includes a support structure, a mounting device rotatably supported at the support structure and a substantially rigid panel formed of a radiation attenuation material and coupled to a first portion of the mounting device. The panel is configured to move between a retracted position and an extended position. The radiation attenuation system further includes a counter balance coupled to a second portion of the mounting device. The counter balance has a weight configured to assist in moving the panel between the retracted position and the extended position.

Another exemplary embodiment relates to a method of attenuating radiation within a scanning device. The method includes the step of coupling a support structure to at least one of an entrance port of the scanning device and an exit port of the scanning device. The support structure includes a pivot shaft extending in a lateral direction. The method further includes the steps of rotatably supporting a plurality of mounting devices on the pivot shaft, coupling a rigid panel formed of a radiation attenuation material to a first portion of each mounting and coupling a counter balance to a second portion of each mounting device opposite the panel.

DETAILED DESCRIPTION

Figure 1:
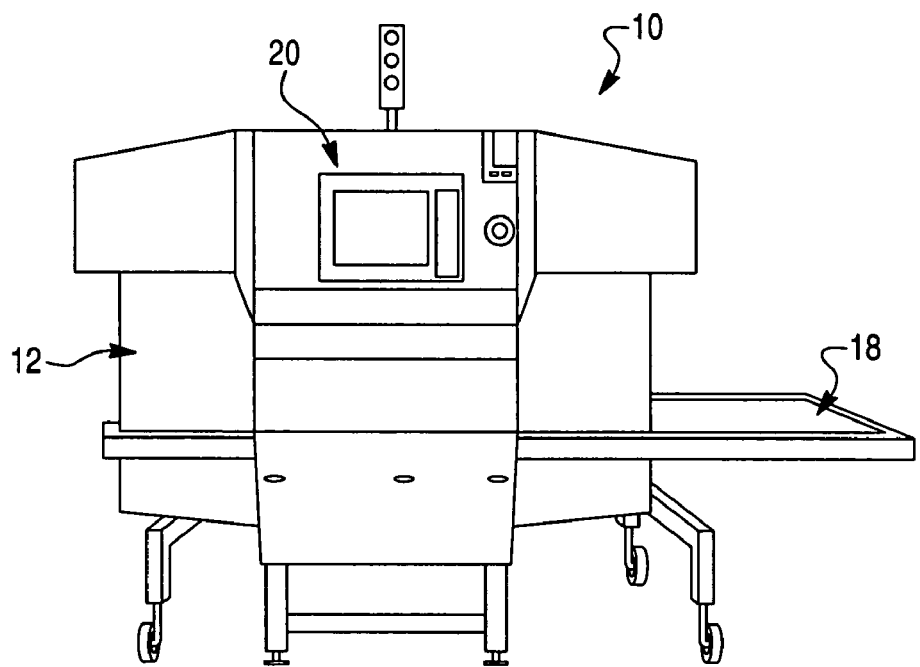
FIG. 1 is a side elevation view of a radiation scanning device according to an exemplary embodiment.

Referring generally to FIGURES, a radiation attenuation system is shown according to an exemplary embodiment. The radiation attenuation system includes one or more radiation shield members (e.g., barriers, curtains, walls, flaps, fingers, etc.) supported in a manner and at a position that may be useful in attenuating (e.g., blocking, reflecting, absorbing, shielding, etc.) radiation generated by a scanning device being used in the monitoring, inspection and/or treatment of an object within the device.

For illustrative purposes only, the scanning device is shown and described herein as a scanning device capable of inspecting a food material, such as meat. The scanning device generally includes a housing (e.g., tunnel, etc.) having a first opening provided at a material input side of the device, and configured as an entrance port, and a second opening provided at an output side of the device, and configured as an exit port. The scanning device also includes a radiation source (e.g., emitter, etc.) for irradiating a food material within the housing and at least one mechanism for transporting (e.g., feeding, conveying, etc.) the food material through the housing thereby forming a food material stream. To facilitate the containment of the radiation (e.g., primary beam radiation, secondary or scatter radiation, etc.) within the housing and/or to reduce the amount of radiation exiting the housing, the radiation attenuation system is supported at or near the exit port and/or the entrance port of the housing.

As stated above, the radiation attenuation system includes one or more radiation shield members for attenuating the radiation emitted within the housing of the scanning device. According to an exemplary embodiment, the radiation shield members are in the form of a plurality of substantially rigid fingers supported at the exit port and/or entrance port of the housing. The fingers are generally arranged in the same lateral plane extending substantially across a width of the exit port and/or entrance port and hang downward in a generally vertical direction to at least partially seal off the exit port and/or entrance port from radiation leakage. The fingers are arranged closely adjacent to each other as they extend laterally across the width of the exit port and/or the entrance port.

The fingers are movably supported relative to the housing so that the food material stream can pass through the radiation attenuation system by moving the fingers out of the way. According to an exemplary embodiment, the each finger is configured to move independent of the remaining fingers. This independent movement of the fingers accounts for potential variations a cross section of the food material stream and may allow for improved shielding since the fingers are able to more readily adjust (e.g., conform, etc.) to the varying size of the food material stream. To increase the likelihood that the fingers are free to move independently of each other, a slight gap separates adjacent fingers. According to the various alternative embodiments, movement of one or more the fingers may depend upon the movement of another finger within the system.

A mounting device is coupled to the upper ends of the fingers for supporting the fingers in a rotatable manner relative to the housing. According to an exemplary embodiment, the mounting device includes an aperture (e.g., opening, recess, slot, etc.) configured to receive a pivot shaft defining an axis about which the fingers are configured to rotate when engaged by the food material stream. The fingers are configured to be directly engaged by the food material stream and are formed of a material that reduces the likelihood that the food material stream will be contaminated due to its direct contact with the fingers. The material forming the fingers may also reduce the drag (e.g., friction, etc.) created when the food material stream engages the fingers thereby reducing a slow down of the operation of the x-ray scanning device.

To facilitate a relatively unrestricted flow of the food material stream through the radiation attenuation system, a weighted member (e.g., counter balance, etc.) is coupled to the mounting device at a side opposite the fingers. Inclusion of the weighted member reduces the amount of force that the food material stream must continuing apply to the fingers in order to rotate the fingers about the pivot shaft and allow for the food material stream to pass therethrough. When the food material stream engages the finger, the weighted member assists in rotating the finger about the pivot shaft. Limiting the amount of force required to rotate the fingers may advantageously assist in maintaining the integrity of the food material within the food material stream and/or may reduce the likelihood of a slow down caused by a relatively light weight food material stream collecting behind the fingers.

Before discussing the details of the radiation attenuation system and/or the scanning device, it should be noted at the outset that references to "front," "back," "rear," "upper," "lower," "right," and "left" in this description are merely used to identify the various elements as they are oriented in the FIGURES, with "front," "back," and "rear" being relative to the direction of travel of the food material through the x-ray scanning device. These terms are not meant to limit the element which they describe, as the various elements may be oriented differently in various applications.

It should also be noted that while the radiation attenuation system is described with reference to a scanning device configured to monitor, inspect and/or treat any of a variety of meats including beef, chicken, pork, lamb, deer, turkey, game bird, fish, crustacean, etc., the radiation attenuation system may be used with any scanning device configured to monitor, inspect and/or treat any of a variety of other food products or non-food products. For example, the radiation attenuation system may be used in combination with a scanning device configured to detect potentially dangerous devices and/or contraband contained within packages, baggage, briefcases, purses, etc.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 2:
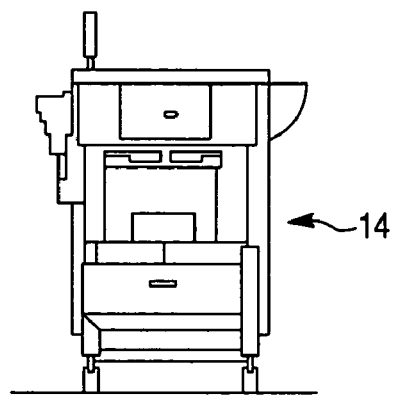
FIG. 2 is a front elevation view of the radiation scanning device of FIG. 1 showing an input port according to an exemplary embodiment.
Figure 3:
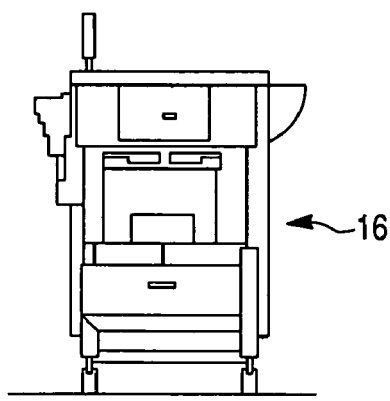
FIG. 3 is a rear elevation view of the radiation scanning device of FIG. 1 showing an exit port according to an exemplary embodiment.
Figure 4:
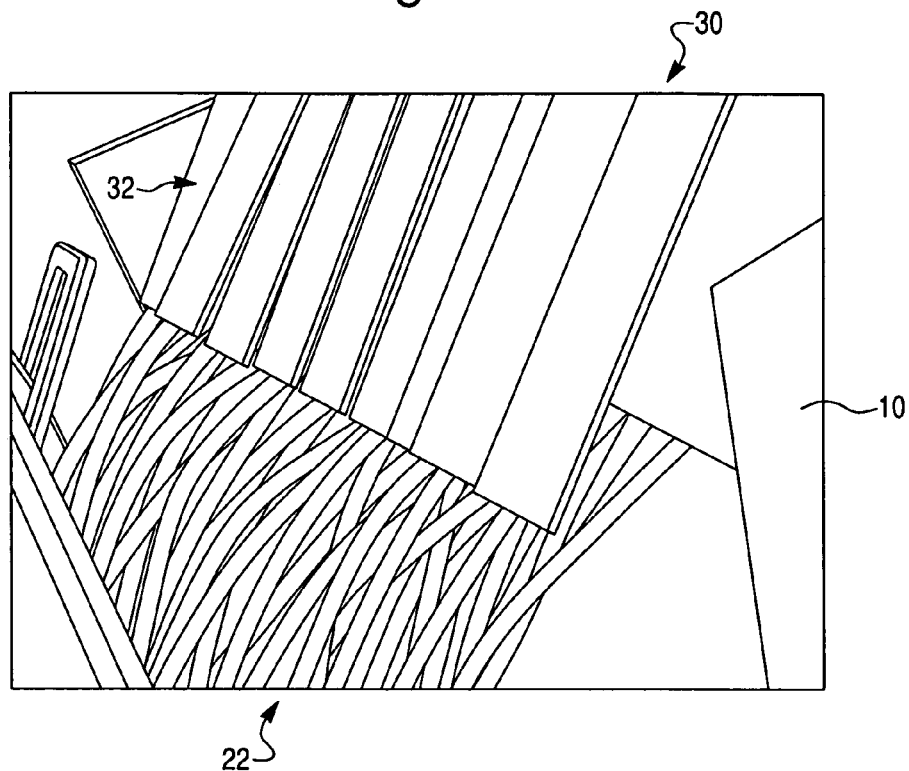
FIG. 4 is a perspective view of a food material stream exiting from the radiation scanning device of FIG. 1.

Referring to FIGS. 1 through 3 in particular, a radiation scanning device 10 is shown according to an exemplary embodiment. Scanning device 10 generally includes a housing (e.g., body, frame structure, etc.), shown as a tunnel 12, having a first opening, shown in FIG. 2 as an entrance port 14, and a second opening, shown in FIG. 3 as an exit port 16. Scanning device 10 also includes at least one mechanism, shown in FIGS. 9 and 10 as a conveyor system 18, for feeding a food material through the system 10 thus forming a food material stream 22 (shown in FIG. 4), a radiation analysis unit (not shown) and a operator interface 20.

Figure 9:
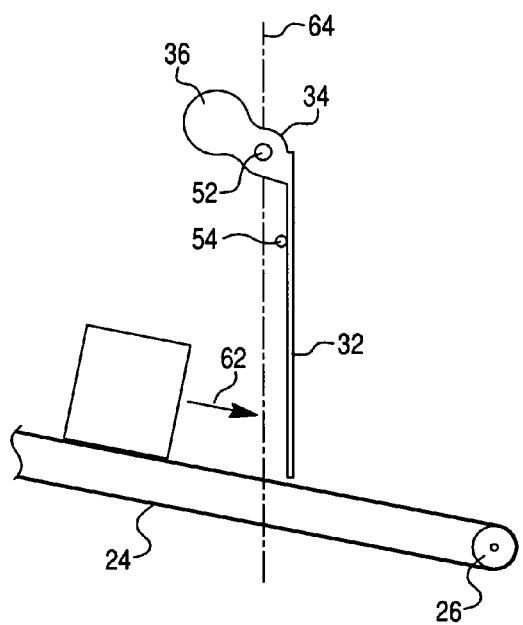
FIG. 9 is a side elevation view of an exit side of a radiation scanning device with a radiation attenuation system shown in a first position.
Figure 10:
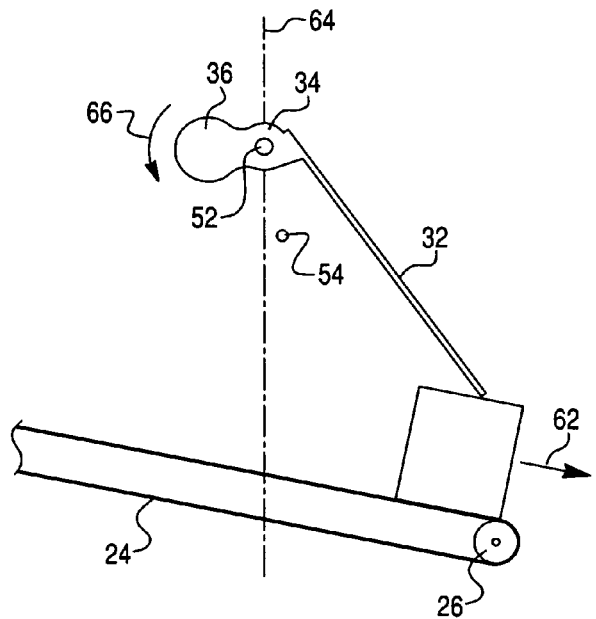
FIG. 10 is a side elevation view of an exit side of a radiation scanning device with a radiation attenuation system shown in a second position.

Conveyor system 18 is configured to move a food material stream into entrance port 14, through tunnel 12 and out of exit port 16. Conveyor system 18 generally includes a conveyor belt 24 and one or more pulleys 26 (shown in FIGS. 9 and 10). Conveyor system 18 may provide continuous movement of the food material stream through scanning device 10, or alternatively, may provide intermittent movement (e.g., cyclical, batch, etc.) of the food material stream through scanning device 10. According to the embodiment illustrated, conveyor belt 24 may be orientated at a slightly downward angle as shown in FIGS. 9 and 10 for allowing gravity to assist in the movement of the food material stream towards exit port 16. According to the various alternative embodiments, conveyor belt 24 may be provided at any of a variety of orientation, including, but not limited to, being substantially parallel to a ground surface upon which scanning device 10 is supported.

It should be noted that radiation attenuation system 30, detailed below, is not limited for use with scanning devices utilizing conveyor-type material transport system. Radiation attenuation system 30 is suitable for use with a multitude of different mechanisms for transporting or feeding a material through the scanning device. For example, radiation attenuation system 30 may be configured for use with a pump system (e.g., a positive displacement type pump, a vacuum pump, etc.) similar to that disclosed in U.S. Pat. No. 7,164,749, entitled "Method and Apparatus for Meat Scanning," the disclosure of which is hereby incorporated by reference in its entirety. According to further alternative embodiments, radiation attenuation system 30 may be configured to be used with a scanning device that does not utilize a transport system (e.g., a scanning device that relies upon gravity to move a material through the scanning device, etc.).

Once moved into tunnel 12, the food material stream is irradiated by the radiation analysis unit. The radiation analysis unit has a radiation device comprising a source of radiation (e.g., x-rays, gamma rays, etc.) and at least one radiation sensor. The radiation device may comprise many existing radiation systems that are known or otherwise suitable for monitoring, inspecting and/or treating the food material stream, such as, but not limited to, dual energy x-ray systems, Computed Tomography systems, linear x-ray systems, etc. The radiation sensor and any other detection equipment enable the energies of the radiation to be detected after transmission through the food material stream in tunnel 12.

According to an exemplary embodiment, one or more primary radiation beams are passed through the food material stream, the beams being attenuated thereby, and the degree of attenuation being used to monitor, inspect and/or treat the food material stream. For example, the degree of attenuation may be used to calculate the fat percentages the food material stream. After being irradiated, the food material stream is then moved out of tunnel 12 and through exit port 16.

Located at entrance port 14 and/or exit port 16 is a radiation attenuation system configured to reduce the amount of radiation (e.g., primary beam radiation, secondary or scatter radiation, etc.) emanating from scanning device 10 through entrance port 14 and/or exit port 16 as the food material stream passes therethrough. Referring generally to FIGS. 4 through 10, a radiation attenuation system 30 is shown according to an exemplary embodiment. Radiation attenuation system 30 is in the form of a movable wall (e.g., barrier, curtain, drape, window, door, etc.) extending across a substantial portion of the width of the entrance port 14 and/or the exit port 16. According to an exemplary embodiment, radiation attenuation system 30 is provided at both entrance port 14 and exit port 16 thereby protecting personnel proximate to scanning device 10 from radiation exposure during operation from both open ends of the device.

Referring to FIGS. 4 through 7, radiation attenuation system 30 is formed of a plurality of radiation shield members (e.g., flaps, strips, fingers, etc.), shown as panels 32. Each panel 32 includes a mounting device (e.g., support structure, etc.), shown as a bracket 34, and a weighted member (e.g., counter weight, etc.), shown as a counterbalance 36, associated therewith. Radiation attenuation system 30 is further shown as including a support frame 38 capable of supporting panels 32 at entrance port 14 and exit port 16 of scanning device 10.

Panels 32 are configured to move relative to frame 38 and scanning device 10 between a retracted or rest position (shown in FIG. 9) and an extended or engaged position (shown in FIG. 10). According to an exemplary embodiment, panels 32 are configured to move upon being directly engaged by the food material stream with a sufficient force. Movement of panels 32 to the engaged position allows the food material stream to pass under panels 32. According to an exemplary embodiment, each panel 32 is configured to move independent of the remaining panels 32. Independent movement of panels 32 accounts for potential variations a cross section of the food material stream and may allow for improved shielding since panels 32 are able to more readily adjust to the varying size of the food material stream. For example, at any given time, one panel 32 may be rotated more or less than other panels 32. According to the various alternative embodiments, movement of panels 32 may depend upon the movement of another panel 32 within radiation attenuation system 30.

Figure 8:
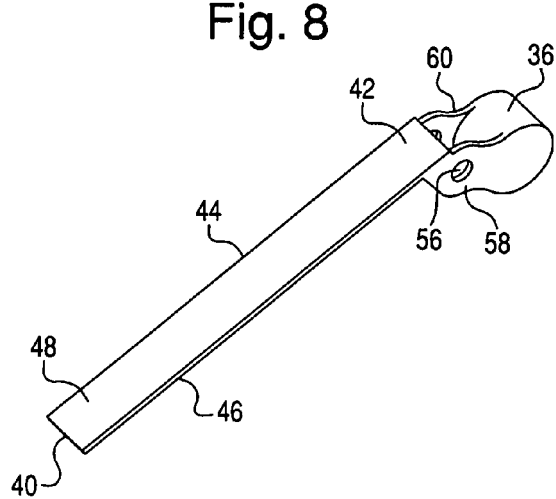
FIG. 8 is a perspective view of a single shield member of the radiation attenuation system of FIG. 5.

Referring to FIG. 8, panels 32 are shown as being generally rectangular members having a height extending vertically between a first or lower end 40 and a second or upper end 42 and a width extending horizontally between a first or left side 44 and a second or right side 46. Panels 32 are further shown as being defined by a first or rear surface 48 and a second or front surface 50 (shown in FIG. 7). According to an exemplary embodiment, lower ends 40 include a bottom edge corresponding to contours of conveyor belt 24. According to the embodiment illustrated, lower ends 40 include a bottom edge that is a substantially straight edge that is generally parallel with conveyor belt 24. Depending on various design criteria (e.g., the configuration of entrance port 14 and/or exit port 16, etc), the height of each panel 32 may remain generally constant between the panels (as shown) or alternatively, may vary.

Panels 32 are relatively rigid members configured to substantially resist deformation (e.g., deflection, etc.) when engaged by the food material stream and moved about frame 38. Using a substantially rigid member for panel 32, rather than a flexible member, reduces the amount of contact that panel 32 has with the food material stream. A flexible member would at least partially conform to the food material stream thereby increasing the amount of contact between the member and the food material stream. Prolonged contact between an attenuating member and the food material stream may damage the food material stream. Panels 32 are at least partially formed of a radiation attenuation material. According to an exemplary embodiment, panels 32 are at least partially formed of a material that allows the food material stream to directly engage panels 32 without becoming contaminated from such contact. According to an exemplary embodiment, panels 32 are also at least partially formed of a material having a relatively low coefficient of friction (e.g., static and/or sliding, etc.) so that when the food material stream directly engages panels 32, the amount of drag between panels 32 and the food material stream is reduced.

According to the embodiment illustrated, panels 32 are formed entirely of stainless steel. Stainless steel is a radiation attenuation material that been accepted in the food industry as a material that can come into direct contact with food. Stainless steel was not previously used in radiation attenuation systems for scanning devices due to the substantial weight of the material. Requiring a food material stream to move such a weight may jeopardize the physical properties of the food material stream and/or may cause the transport of the food material stream to slow down from becoming backed-up or jammed behind panels 32. The applicants of the present disclosure have discovered that the addition of a weighted member, as detailed below, configured to at least partially offset the weight of panels 32 makes stainless steel a viable option for a radiation shield in a scanning device.

According to the various alternative embodiments, the radiation attenuation material of panels 32 may be fabricated of any of a variety of radiation attenuation materials including, but not limited to, bismuth, barium, lead, tungsten, antimony, copper tin, aluminum, iron, iodine, cadmium, mercury, silver, nickel, zinc, thallium, tantalum, tellurium, and uranium. Anyone of the aforementioned radiation attenuation materials alone or in a combination of two or more of the radiation attenuation materials may provide the desired level of radiation attenuation. It should be noted that the radiation attenuation material of panels 32 is not limited to such radiation attenuation materials, and according to further alternative embodiments, may be formed of any suitable radiation attenuating material including more conventional attenuating materials (e.g., lead-based materials, etc.). One or more of the aforementioned materials may be embedded in, dispersed in and/or coated by a relatively non-attenuating material that may be suitable for directly engaging the food material stream (e.g., a plastic, etc.).

Referring back to FIGS. 6 and 7, panels 32 are arranged so that they extend across a substantial portion of the width of entrance port 14 and exit port 16 with a left side 44 of a first panel 32 being near a right side 46 of an adjacent second panel 32. According to an exemplary embodiment, a slight gap exists between adjacent panels 32 so that panels 32 are free to move independent of each other without significant friction between panels interfering with such movement. The size of such a gap is minimized to limit the amount of radiation passing through radiation attenuation system 30. According to the various alternative embodiments, adjacent panels 32 may be abutting (e.g., touching, etc.) each other thereby eliminating the presence of any gaps. In such an embodiment, one or more friction reducing elements (e.g., a bearing surface, etc.) may be provided between adjacent panels 32 in an effort to improve the movement of panels 32. According to further alternative embodiments, adjacent panels 32 may at least partially overlap.

Figure 5:
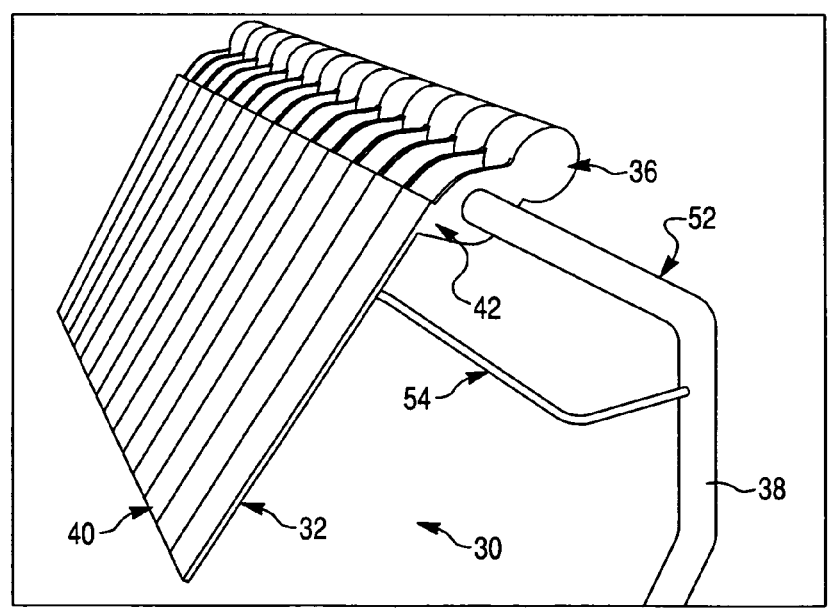
FIG. 5 is a perspective view of a radiation attenuation system according to an exemplary embodiment.
Figure 6:
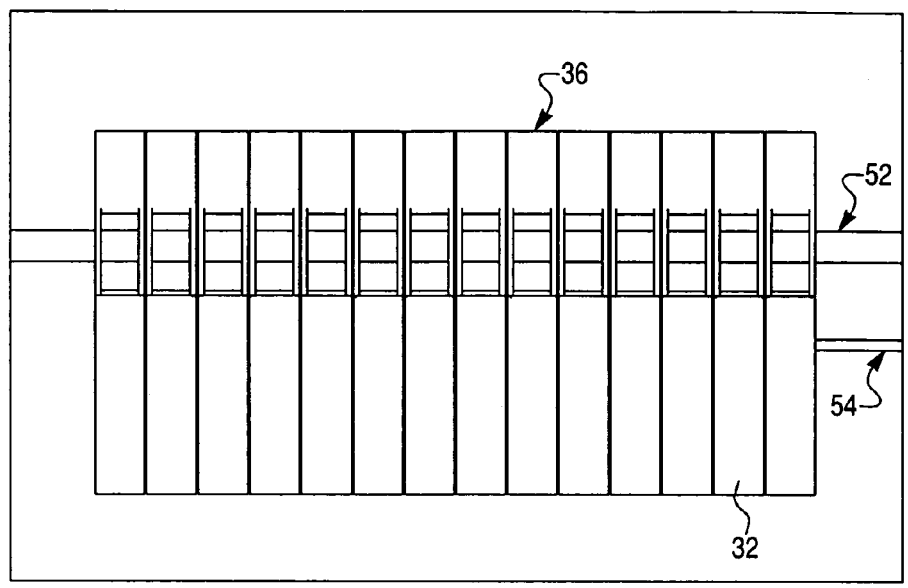
FIG. 6 is a top view of the radiation attenuation system of FIG. 5.
Figure 7:
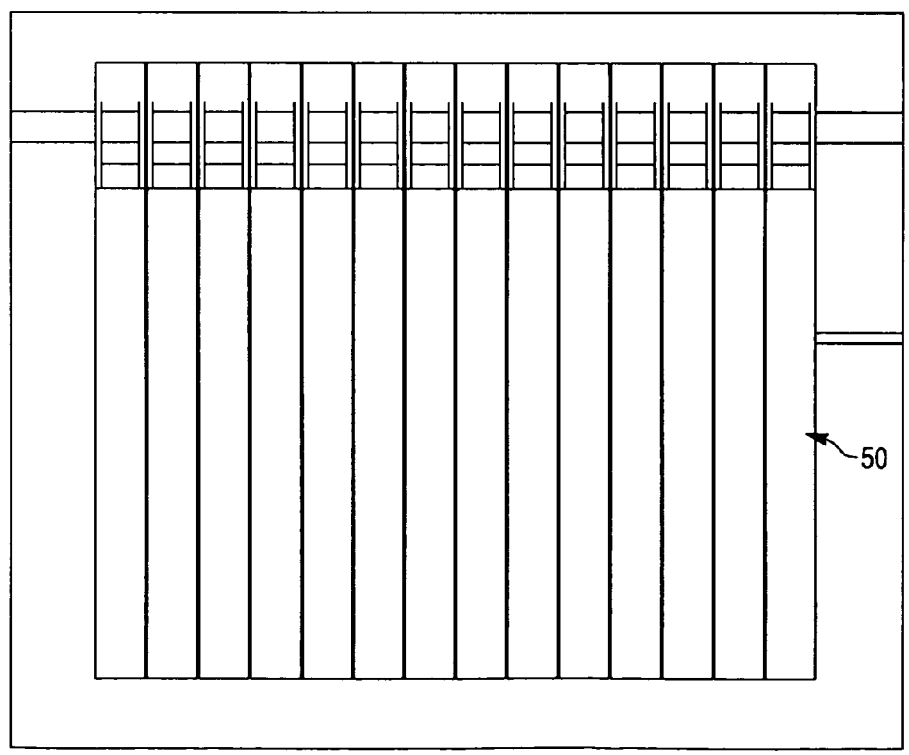
FIG. 7 is a rear elevation view of the radiation attenuation system of FIG. 5.

Referring to back to FIG. 5, brackets 34 are provided to movably support panels 32 on frame 38. According to an exemplary embodiment, bracket 34 is shown as being coupled to upper end 42 of panel 32. Bracket 34 may be a separate member coupled to panel 32 using any of a variety of known or otherwise suitable techniques including, but not limited to, welding, a mechanical fastener (e.g., bolts, rivets, screws, etc.), adhesive, etc. According to the embodiment illustrated, bracket 34 is a separate member formed of stainless steel that is welded to panel 32. According to the various alternative embodiments, bracket 34 may be coupled to panel 32 by being integrally formed therewith to provide a single, one-piece unitary body. According to further alternative embodiments, bracket 34 may be formed of a material different than panel 32.

According to the embodiment illustrated, bracket 34 includes a first or right bracket portion 58 and a second or left bracket portion 60. Right bracket portion 58 is substantially identical to left bracket portion 60 and is spaced apart in a lateral direction therefrom. Forming bracket portion 34 as a right bracket portion 58 and a left bracket portion 60 may reduce the amount of surface contact between bracket 34 and frame 38. Reducing the amount of contact between bracket 34 and frame 38 reduces the amount of friction existing between those two members thereby improving the movement of panel 32 relative to frame 38. According to the various alternative embodiments, a friction reducing element (e.g., a roller bearing, etc.) may be provided between the interface of bracket 34 and frame 38.

Frame 38 generally includes one or more structures configured to serve as a base or foundation (e.g., support structure, etc.) for panels 32, brackets 34 and/or counter balances 36. According to the embodiment illustrated, frame 38 includes a pivot shaft 52 and a stop mechanism 54. Pivot shaft 52 is shown as a substantially circular rod that provides a structure about which panels 32 are configured to rotate. According to an exemplary embodiment, bracket 34 defines an aperture 56 that is configured to receive pivot shaft 52 in a concentrically aligned manner. In such an embodiment, pivot shaft 52 defines an axis of rotation of panels 32, the access of rotation being substantially perpendicular to the direction the food material stream along conveyor system 18.

Referring to FIG. 5, frame 38 is further shown as including stop mechanism 54. Stop mechanism 54 is configured to align panels 32 and/or restrict the rotation of panels 32 in a downward direction. According to an exemplary embodiment, stop mechanism 54 is in the form of a rod extending in a lateral direction and substantially parallel to pivot shaft 52. Stop mechanism 54 is configured to engage front surfaces 50 of panels 32 thereby preventing panels 32 from continuing to be rotated downward and possibility interfere with the operation of conveyor system 18.

It should be noted that frame 38 may be coupled to scanning device 10 or may be a self-supportive structure. Further frame 38 may be configured so that it can be selectively added to one or more pre-existing scanning devices to provide a retro-fit radiation attenuation system. Configuring frame 38 as a self-supportive structure may improve the ease at which radiation attenuation system 30 can be added to a pre-existing scanning device, but configuring frame 38 to be coupled to the scanning devices may be just as easy to use with pre-existing scanning devices.

As stated above when describing an exemplary embodiment, panels 32 are formed of stainless steal which is a relatively heavy material. To at least partially lessen the amount of force that must be applied to panels 32 by the food material stream to rotate panels 32 about pivot shaft 52 (thereby lessening the resultant force that panels 32 apply to the food material stream), counter balance 36 is provided. Referring to FIGS. 5 and 8, counter balance 36 is shown according to an exemplary embodiment.

Counter balance 36 is shown as being a substantially circular member coupled to bracket 34 at a side opposite panels 32. Counter balance 36 has a weight that is less than the weight of panel 32. According to an exemplary embodiment, counter balance 36 has a weight that is less than, but substantially similar to the weight of panel 32. Using an imaginary line 64 extending through pivot shaft 54 and aperture 56 as reference, the weight of radiation attenuation system 30 to the left of line 64 is substantially equal to, but slightly less than, the weight of radiation attenuation system 30 to the right of line 64.

Counter balance 36 may be a separate member coupled to bracket 34 using any of a variety of known or otherwise suitable techniques including, but not limited to, welding, a mechanical fastener (e.g., bolts, rivets, screws, etc.), adhesive, etc. According to the embodiment illustrated, counter balance is a separate member formed of stainless steel that is welded to bracket 34. According to the various alternative embodiments, counter balance 36 may be coupled to bracket 34 by being integrally formed therewith to provide a single, one-piece unitary body. According to further alternative embodiments, counter balance 36 may be formed of a material different than bracket 34.

Referring to FIGS. 9 and 10, the operation of radiation attenuation system 30 in combination with scanning device 10 is shown according to an exemplary embodiment. In FIGS. 9 and 10, radiation attenuation system 30 is shown as being provided at exit port 16 of scanning device 10 for illustrative purposes only. Radiation attenuation system 30 may also be, or may alternatively be, provided at entrance port 14 of scanning device 10. Referring to FIG. 9 in particular, an article is shown moving along conveyor belt 24 in a direction indicated by an arrow 60. At this stage, the article is likely to still be within tunnel 12 and being irradiated by the radiation analysis unit. Panel 32 is shown as being supported about pivot shaft 52 and restricted from rotating any further in a clockwise direction by stop mechanism 54. Referring to FIG. 10 in particular, the article is shown as engaging front surface 50 of panel 32 to start the rotation of panel 32 about pivot shaft 52. Once panel 32 starts to rotate, counter balance 56 moves is a generally counterclockwise direction indicated by an arrow 66 to continue to rotate panel 32 in the counterclockwise direction so that the article can pass under panel 32 without having panel 32 exert a substantial force on the article. Once the article has completely passed under panel 32, panel 32 returns to its rest position due to the balancing of counter balance 56 and panel 32 relative to pivot shaft 52.

It is important to note that the construction and arrangement of the elements of radiation attenuation system and/or scanning device 10 as shown in the exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the radiation attenuation system may be constructed from any of a wide variety of materials that provide sufficient strength, durability or attenuation factor, in any of a wide variety of colors, textures and combinations. Accordingly, all such modifications are intended to be included within the scope of the present inventions. Other substitutions, modifications, changes and omissions may be made in the design, operating conditions and arrangement of the preferred and other exemplary embodiments without departing from the spirit of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the appended claims.

What is claimed is:

1. A scanning device for providing a radiation scan to an article, the scanning device comprising:
    a housing having a entrance port and an exit port and enclosing a radiation analysis unit;
    a transport system for moving the article from the entrance port, through the housing and to the exit port; and
    a radiation attenuation system supported at one of the entrance port and the exit port, the radiation attenuation system including at least one substantially rigid panel rotatable relative to the housing and a counter balance coupled to the panel to at least partially offset the weight of the panel.

2. The scanning device of claim 1, wherein the at least one panel comprises a plurality of panels arranged in a lateral direction relative to each other.

3. The scanning device of claim 2, wherein the plurality of panels are formed of stainless steel.

4. The scanning device of claim 2, wherein a gap slight gap separates adjacent panels in the lateral direction.

5. The scanning device of claim 2, wherein adjacent panels are substantially abutting each other.

6. The scanning device of claim 2, wherein the radiation attenuation system further includes a mounting device coupled between the counter balance and the panel.

7. The scanning device of claim 6, wherein the mounting device defines an aperture configured to receive a pivot shaft about which the panel is configured to rotate.

8. The scanning device of claim 7, wherein the pivot shaft is coupled to the housing.

9. The scanning device of claim 7, wherein the pivot shaft is a circular rod that defines an axis of rotation of the panel.

10. The scanning device of claim 7, wherein the mounting device is in the form of a bracket configured to engage the pivot shaft in at least two positions that are offset from each other.

11. The scanning device of claim 10, wherein the bracket is configured to directly engage the pivot shaft.

12. The scanning device of claim 7, further comprising a stop mechanism for restricting the rotation of the panels, the stop mechanism being substantially parallel to the pivot shaft.

13. The scanning device of claim 12, wherein stop mechanism restricts the panels from rotating downward toward the transport system.

14. The scanning device of claim 1, wherein transport system is a conveyor system having a conveyor belt and at least one roller.

15. The scanning device of claim 1, wherein the article being scanned is a food product.

16. The scanning device of claim 15, wherein the food product is a meat and the radiation analysis unit is configured to measure the percentage of fat within the meat.

17. The scanning device of claim 1, wherein the weight of the counter balance is substantially the same as the weight of the panel.

18. A radiation attenuation system for use with a scanning device, the radiation attenuation system comprising:
    a support structure;
    a mounting device rotatably supported at the support structure;
    a substantially rigid panel formed of a radiation attenuation material and coupled to a first portion of the mounting device, the panel being configured to move between a retracted position and an extended position; and
    a counter balance coupled to a second portion of the mounting device, wherein the counter balance has a weight configured to assist in moving the panel between the retracted position and the extended position.

19. The radiation attenuation system of claim 18, further comprising a stop mechanism configured to restrict the rotation of the panel in a downward direction.

20. A method of attenuating radiation within a scanning device, the method comprising:

coupling a support structure to at least one of an entrance port of the scanning device and a exit port of the scanning device, the support structure including a pivot shaft extending in a lateral direction;

rotatably supporting a plurality of mounting devices on the pivot shaft;

coupling a rigid panel formed of a radiation attenuation material to a first portion of each mounting; and coupling a counter balance to a second portion of each mounting device opposite the panel.

* * * * *